United States Patent [19]

Gowlett

[11] Patent Number: 5,012,102

[45] Date of Patent: Apr. 30, 1991

[54] METHODS OF PRODUCING VACUUM DEVICES AND INFRARED DETECTORS WITH A GETTER

[75] Inventor: David J. Gowlett, Hampshire, England

[73] Assignee: U.S. Philips Corp., New York, N.Y.

[21] Appl. No.: 521,786

[22] Filed: May 7, 1990

[30] Foreign Application Priority Data

May 10, 1989 [GB] United Kingdom ............ 8910754

[51] Int. Cl.[5] .................................. G12B 15/00
[52] U.S. Cl. .............................. 250/352; 62/51.1; 250/370.15
[58] Field of Search ................ 250/370.15, 352; 62/51.3, 51.2, 51.1

[56] References Cited

U.S. PATENT DOCUMENTS

| | | | |
|---|---|---|---|
| 3,851,173 | 11/1974 | Taylor et al. | 250/352 |
| 4,136,526 | 1/1979 | Chanin et al. | 62/46.3 |
| 4,206,354 | 6/1980 | Small, Jr. | 250/349 |
| 4,262,200 | 4/1981 | Guy | 250/352 |
| 4,955,204 | 9/1990 | Pehl et al. | 62/51.1 |

FOREIGN PATENT DOCUMENTS

| | | | |
|---|---|---|---|
| 0087827 | 9/1983 | European Pat. Off. | |
| 278907 | 4/1977 | U.S.S.R. | 250/370.15 |
| 890373 | 2/1962 | United Kingdom . | |
| 2179785 | 3/1987 | United Kingdom . | |

*Primary Examiner*—Constantine Hannaher
*Attorney, Agent, or Firm*—William L. Botjer

[57] ABSTRACT

A device chamber (12) is evacuated by pumping via an evacuation tube (35) to produce a vacuum space in communication with a chemically-active getter (30) which is provided in the tube (35) to getter gases from the evacuated chamber (12). In accordance with the invention, the getter (30) in the form of one or more movable bodies of the getter material is activated by heating in the evacuation tube (35) at a safe location (36) distant from the chamber (12). It is then moved towards the chamber (12) and is retained in the sealed evacuation-tube outlet (31) of the device. A vacuum-permeable screen (12) in the evacuation-tube outlet (31) inhibits passage of the getter material (30) into the chamber (12) where it might, for example, otherwise damage or obscure an infrared detector element. This permits the inclusion of the getter (30) in an inexpensive manner which does not require the use of a getter unit with a support element and/or vacuum-sealed electrical connections, and is compatible with space limitations and standard device envelope requirements for infrared detectors. Furthermore, the getter (30) is activated by heating at a location which avoids damage to the device, and after moving towards the chamber (12) the evacuation tube (35) is shortened to provide a short (or even non-protruding) outlet (31) from the chamber (12).

10 Claims, 2 Drawing Sheets

METHODS OF PRODUCING VACUUM DEVICES AND INFRARED DETECTORS WITH A GETTER

BACKGROUND OF THE INVENTION

DESCRIPTION

This invention relates to infrared detectors comprising a chamber holding a vacuum space and to methods of producing a vacuum device (particularly but not exclusively an infrared detector), in which a chemically-active getter is provided to getter gases from the evacuated chamber.

Published United Kingdom patent application GB-A-2 179 785 describes a known method of producing and maintaining a vacuum space in a chamber of a vacuum device (for example an electron discharge device such as a ring laser gyroscope), comprising the steps of (a) providing a porous getter in an evacuation tube which forms an outlet of the chamber, (b) evacuating the chamber to produce the vacuum space by means of a vacuum pump connected to the evacuation tube, (c) heating the getter in the evacuation tube so as to activate chemically the getter material and (d) disconnecting the vacuum pump and sealing the evacuation-tube outlet of the chamber while leaving the chemically-active getter in communication with the vacuum space of the chamber to getter gases from the evacuated chamber. By locating the getter within the tubulation used to evacuate the device, problems which otherwise arise in trying to accommodate the getter within the device chamber are avoided. The whole contents of GB-A-2 179 785 are hereby incorporated herein as reference material.

According to GB-A-2 179 785 it is necessary to provide the getter device with a support element to position it within the tubulation. In order to avoid the need for a separate support element, GB-A-2 179 785 describes the provision of the getter as an electrophoretically-deposited layer of porous sintered non-evaporable getter material selectively deposited on the internal surface of the evacuation tube. Getter-free zones are present at each end on the internal surface of the tube. Such a getter also avoids problems of a separately-supported getter becoming detached from its required position or producing loose fragments in the presence of shocks or vibrations.

Infrared detectors are not mentioned in GB-A-2 179 785. They often comprise a vacuum space between inner and outer walls of a dewar envelope. At least one infrared detector element is mounted on an end of the inner wall, normally within the vacuum chamber between the inner and outer walls. The detector elements which are delicate and small need to be protected against damage and must not be obscured to block incidence of the infrared radiation to be detected. The inner wall defines an inner chamber accommodating a cryogenic cooling element which serves to cool the inner wall end and hence the detector element thereon, during operation of the detector. The cooled inner wall is often termed the "cold finger" of the detector.

A major cause of infrared detector failure is the gradual degeneration of the vacuum in the space between the inner and outer walls due to internal out-gassing of the various component parts of the detector exposed to the vacuum. In order to reduce the effects of internal out-gassing it is known to provide at least one getter in the vacuum space for gettering gas molecules from this space. U.S. Pat. No. 3,851,173 describes one example of an infrared detector incorporating a getter to maintain a vacuum in a dewar. A non-evaporable chemically-active SAES getter is mounted on the outer wall and in the vacuum space between the outer wall and the cold finger. Such chemical getters are activated by being taken to a high temperature after evacuating and sealing the dewar envelope. This is normally achieved with an electrical heating element embedded in the getter material formed as a unit with electrical connection leads (not specifically shown in U.S. Pat. No. 3,851,173) passing through vacuum-tight seals in the dewar. U.S. Pat. No. 4,206,354 shows an example of such a dewar getter with its connection leads.

Some protective measure is required between this type of getter and the inner wall, the detector element and its connections in/on the inner wall, all of which could otherwise be damaged by the high activation temperature. This may be achieved as described in U.S. Pat. No. 3,851,173 by using an extra heat-shield member which surrounds a substantial portion of the inner wall to protect the cold finger from the action of the getter. These factors can increase the cost of an infrared detector and may lead to an increased size for the dewar envelope, perhaps even the adoption of an unconventional dewar envelope outline. The heating also produces by-products including some outgassing of the heated parts of the dewar and so adds gases to the vacuum space.

SUMMARY OF THE INVENTION

According to one aspect of the present invention there is provided a method of producing a vacuum device (particularly, but not exclusively, an infrared detector) having a vacuum space in a chamber of the device, comprising the steps of (a) providing a porous getter in an evacuation tube which forms an outlet of the chamber, (b) evacuating the chamber to produce the vacuum space by means of a vacuum pump connected to the evacuation tube, (c) heating the getter in the evacuation tube so as to activate chemically the getter material and (d) disconnecting the vacuum pump and sealing the evacuation-tube outlet of the chamber while leaving the chemically-active getter in communication with the vacuum space of the chamber to getter gases from the evacuated chamber, characterised in that the step (a) comprises providing the getter as at least one movable body of the getter material in the evacuation tube, in that step (b) comprises heating the getter body in the evacuation tube at a location distant from the chamber, after which the movable getter body is moved closer to the chamber before sealing the evacuation-tube outlet, and in that the evacuation-tube outlet comprises a vacuum-permeable screen or other means which inhibits passage of the getter material into the chamber.

The present invention provides a chemically-active getter in the device in a comparatively inexpensive manner as at least one movable body in the evacuation tube, and so does not require the use of a getter unit (with a support element or electrical connections) nor of a selective deposition of getter material on an internal surface of the evacuation tube. The length of the evacuation tube is sufficient to permit the getter body to be heated at a location distant from the chamber so that the dimensions of the chamber walls need not be adapted to prevent damage to the chamber (and any sensitive device elements therein) by the use of high activation temperatures at that distant location. In general the gettering capacity of the getter material can be increased with increase in the activation temperature, and so the use of high temperatures is generally desirable. For this purpose a high-temperature material (e.g. fused silica or a ceramic) may be used for the part of the tube where the getter is activated and/or a far distant location may be used, and this part of the tube used for activation may be removed after moving the loose getter towards the chamber. This permits the use of high activation temperatures together with the achievement of a short (or even non-protruding) evacuation-tube outlet in the final device structure.

These features can be advantageous for a variety of different vacuum devices, but they are especially useful for maintaining a very compact size, standard outline and inexpensive cost for an infrared detector. The invention permits the getter material to be activated and exposed to the vacuum space before disconnecting and sealing the evacuation tube so that by-products of the activation can be pumped away. Furthermore, the screen in the evacuation-tube outlet inhibits passage of the getter material into the chamber. This feature also is especially useful for a compact infrared detector where care is required to protect the detector elements against obscuration and damage by particles.

Thus, according to another aspect of the invention there is provided an infrared detector (or possibly another type of vacuum device) comprising a chamber holding a vacuum space in the device, the chamber having an evacuation-tube outlet through which the chamber was evacuated, which outlet communicates at one end with the vacuum space of the chamber and is sealed at its opposite end, and a chemically-active porous getter is present in communication with the vacuum space of the chamber to getter gases from the evacuated chamber. The device in accordance with the invention is characterised in that the getter comprises at least one movable body of the chemically-active getter material present in the evacuation-tube outlet, and in that the evacuation-tube outlet has a vacuum-permeable screen present between the loose getter body and the chamber to inhibit passage of the getter material into the chamber.

In the manufacture of the device the disconnection and sealing step (d) preferably includes shortening the evacuation tube to a location less distant from the chamber than the location at which the getter body is heated in the activation step (b). This avoids retaining a long protruding length of the tube in the final device even when a far distant location was used for heating to a high activation temperature. However, if desired, the evacuation-tube outlet as retained in the final device may comprise a length of the tube extending to a location which is reasonably distant from the chamber and to and from which the getter body may be moved along the tube by tilting the device, and in this case the getter material may be chemically activated or reactivated by heating to a less high temperature at that location during the operating lifetime of the device.

BRIEF DESCRIPTION OF THE DRAWINGS

These and other features in accordance with the invention are illustrated, by way of example, in specific embodiments of the invention now to be described with reference to the accompanying diagrammatic drawings, in which.

Figure 1:
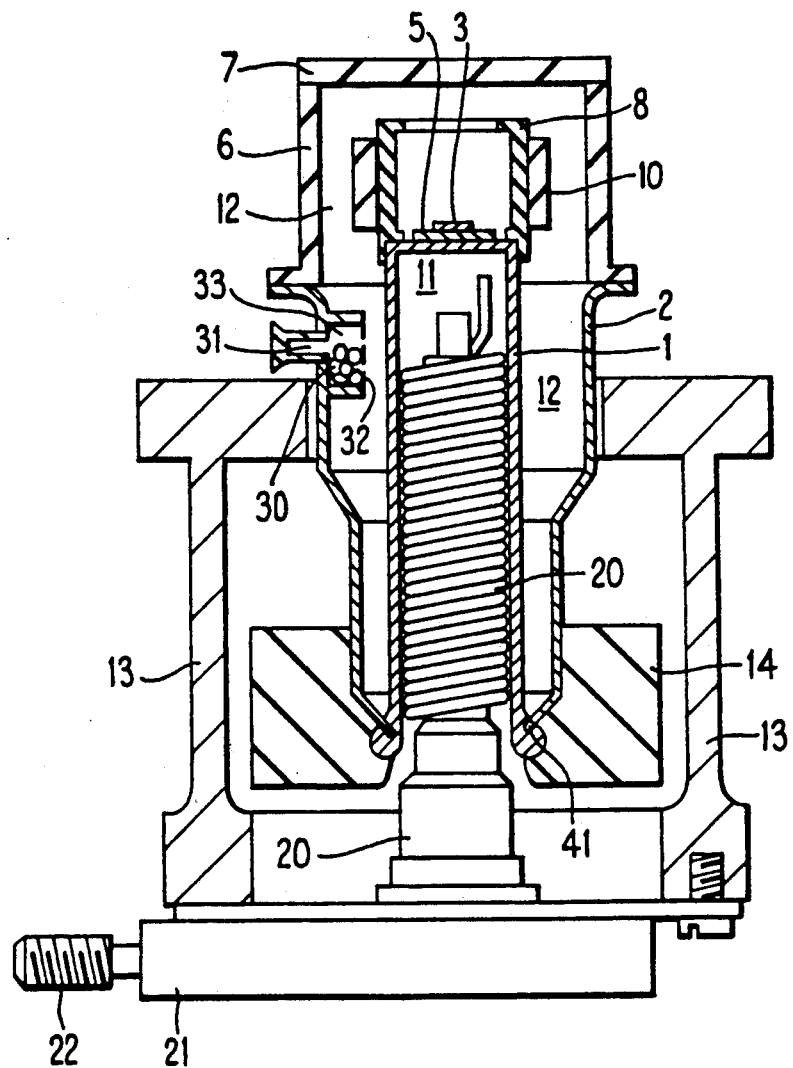
FIG. 1 is a partly cross-sectional view and partly side view of an infrared detector in accordance with the invention, and having a vacuum space produced therein by a method in accordance with the present invention.

It should be noted that the Figures are diagrammatic and not drawn to scale. The relative dimensions and proportions of some parts of these drawings have been exaggerated or reduced in size for the sake of clarity and convenience in the drawings. The same reference signs as used in one embodiment are generally used when referring to corresponding or similar parts in another embodiment.

DETAILED DESCRIPTION OF THE PREFERRED EMBODIMENT

In the embodiment of FIG. 1, the invention is illustrated as a modification of an infrared detector dewar similar to that described in published European patent applications EP-A-0 006 277 and EP-A-0 087 827, the whole contents of the disclosure of which are hereby incorporated herein as reference material. Similarly the whole contents of the disclosure of U.S. Pat. No. 3,851,173 and U.S. Pat. No. 4,206,354 are hereby incorporated herein as reference material.

Some parts of the infrared detector of FIG. 1 which it is not necessary to describe for an understanding of how to perform the present invention have not been shown in the drawings, but may be provided in known manner.

The infrared radiation detector of FIG. 1 comprises a dewar envelope 1,2, having an inner wall 1 and an outer wall 2. The inner wall 1 defines an inner chamber 11 of the dewar envelope. An outer chamber 12 holding a vacuum space is present between the inner and outer walls 1 and 2. At least one infrared radiation detector element 3 is mounted on the end face of the inner wall 1, in the vacuum space. The detector element or elements 3 may be of known type and may be secured in known manner to a substrate 5, for example of sapphire, on this end face.

The dewar envelope 1,2 may be of known type. The inner wall 1 may be of glass the thickness of which may be for example 0.5 mm, and the outer wall 2 may be of for example metal. Although not shown in the drawing the inner glass wall 1 includes in known manner electrical conductors which are either on its outer surface or embedded in that surface. These conductors are electrically connected to electrodes of the detector element(s) 3 adjacent the end face of the inner wall 1, extend along the length of the inner wall 1 and pass outside the dewar envelope 1,2 where they are electrically connected in known manner to external connections for the detector. The outer wall 2 of the dewar comprises an end portion 6,7 which is not sealed to the remainder of the dewar envelope 1,2 until after mounting and connecting the detector element 3. The end face 7 of the outer wall 2 consists of a window transparent to the infrared radiation to to detected. An annular radiation shield 8 is also included around the detector element 3 in known manner.

In order to reduce outgassing of the component parts of the detector in the vacuum space during operation of the detector, these component parts are prebaked in known manner in vacuo before assembly, and a general bakeout of the assembly is also carried out before mounting the detector element(s) 3. After sealing the dewar end portion 6,7 to the remainder of the outer wall 2, the chamber 12 between the walls 1 and 2 is evacuated and the desired vacuum space is produced and maintained in accordance with the present invention. The steps used to produce the vacuum space will be described hereinafter with reference to FIGS. 3A and 3B.

A major cause of infrared detector failure is the gradual degeneration of the vacuum in the space 12 between the inner and outer walls 1 and 2 due to internal outgassing of the various component parts of the detector exposed to the vacuum. The excessive outgassing which occurs in infrared detectors is associated with the fact that the gases cannot be driven out by baking the whole device during pumping (in the way which is usual for other vacuum devices) because infrared detector elements 3 are damaged at high temperatures. This degeneration in the vacuum eventually leads to the situation in which a cooling element 20 is no longer able (at least in an efficient manner or sufficiently fast) to cool the detector element 3 to the desired temperature for efficient detection of the infrared radiation. Thus, the detector lifetime is curtailed, especially as only limited cooling power is available in infrared detectors. Furthermore the outgassing into the vacuum space provides a thermal path between the cold finger 1 and the outside 2,7 of the detector so that, for example, dew will form on the infrared-transmissive window 7 of the detector in a normal atmosphere. In order to reduce these effects of internal out-gassing at least one getter 30 is provided in the vacuum space 12 for gettering gas molecules from this space 12.

FIG. 1 illustrates an example of the final product, in which it can be seen that the chamber 12 has an evacuation-tube outlet 31 through which it was evacuated, and a chemically-active non-evaporable getter 30 is present in the tube 35 in communication with the vacuum space of the chamber 12 to getter gases from the evacuated chamber 12. This outlet 31 communicates at one end with the vacuum space of the chamber 12 and is sealed at its opposite end to prevent leakage of the vacuum from the chamber 12 (i.e. to prevent leakage of ambient gas into the chamber 12 via the outlet 31). In accordance with the present invention, the chemically-active getter comprises at least one loose body 30 of porous getter material present in the evacuation-tube outlet 31, and the outlet 31 has a vacuum-permeable screen 32 present between the getter body 30 and the chamber 12 to inhibit passage of the getter material (either the body 30 or fragments thereof) into the chamber 12. This is a compact but satisfactory arrangement for incorporating a chemically-active getter 30 in an infrared detector. It does not require vacuum-tight seals for any electrical connections to the getter 30, nor a support element attached to the getter 30, nor electrophoretic deposition of getter material on the internal surface of the evacuation-tube 35.

The inner wall 1 of the dewar envelope defines the inner chamber 11 into which an elongate cooling element 20 is inserted and along which it extends towards the end face of the inner wall 1 for cooling the detector element 3 in known manner during operation of the detector. The radiation shield 8 in the embodiment illustrated by way of example in FIG. 1 is also mounted on the inner wall 1 so as to be cooled by the cooling element 20. If so desired, additional (non-chemical) gettering action may also be used in the vacuum chamber 12 by including at least one shaped zeolite body 10 as a cooled molecular sieve on the cooled radiation shield 8 or elsewhere on the cold finger, in accordance with the teaching in EP-A-0 087 827.

The cooling element 20 may be a known type of cryostat which is designed to utilize, for example, the refrigerating capability of the Joule-Thomson effect. This involves bleeding a fluid under pressure through a valve or other orifice into an area of lower pressure. When the fluid expands it absorbs heat in the low pressure area thus producing the cooling effect. The inner chamber 11 of the dewar envelope 1, 2 adjacent the end face constitutes the low-pressure area. The cryogen fluid which may be for example dry air, nitrogen, or argon is supplied to the cooling element 20 via an inlet 22 of a mount 21. This mount 21 may be constructed with a resilient coupling in the manner disclosed in EP-A-0 006 297 so as to control movement of the cooling element 20 with respect to the inner wall 1 and detector element(s) 3.

The envelope arrangement of FIG. 1 also comprises a dewar-mount 13 in which the dewar envelope 1, 2 is partially accommodated. The mount 13 may be partially filled with, for example, silicone rubber 14 particularly around the connection 41 of the inner and outer walls 1 and 2 of the dewar envelope and the electrical connections to the electrical conductors for the detector element(s) 3. The dewar envelope 1, 2 is secured in the mount 13, and the cooler-mount 21 is, for example, bolted to the dewar-mount 13 to hold the cooling element 20 in the dewar chamber 11. The whole mounting arrangement is designed so as to suppress undesirable movement (especially irregular vibration) of the detector element(s) 3 in the field of view of the detector optical system. In the form illustrated in FIG. 1 (and FIGS. 3A and 3B), the chemical getter is in the form of a plurality of loose bodies 30 which are free to move around in the evacuation-tube outlet 31 with movement of the detector. However, the outlet 31 with these getter bodies 30 is present on the outer wall 2 of the dewar, and the detector element(s) 3 is/are mounted on the end of the inner wall 1 remote from the connection 41 of the inner and outer walls 1 and 2. Using this arrangement, no significant microphonic noise is transmitted to the detector element(s) 3 by irregular vibration and other movement of the getter bodies 30 in the evacuation-tube outlet 31.

Figure 2:
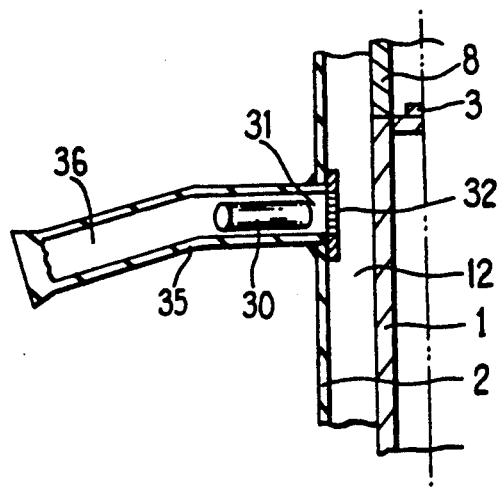
FIG. 2 is a cross-sectional view of part of an infrared detector illustrating a modification in accordance with the invention.
Figure 3A:
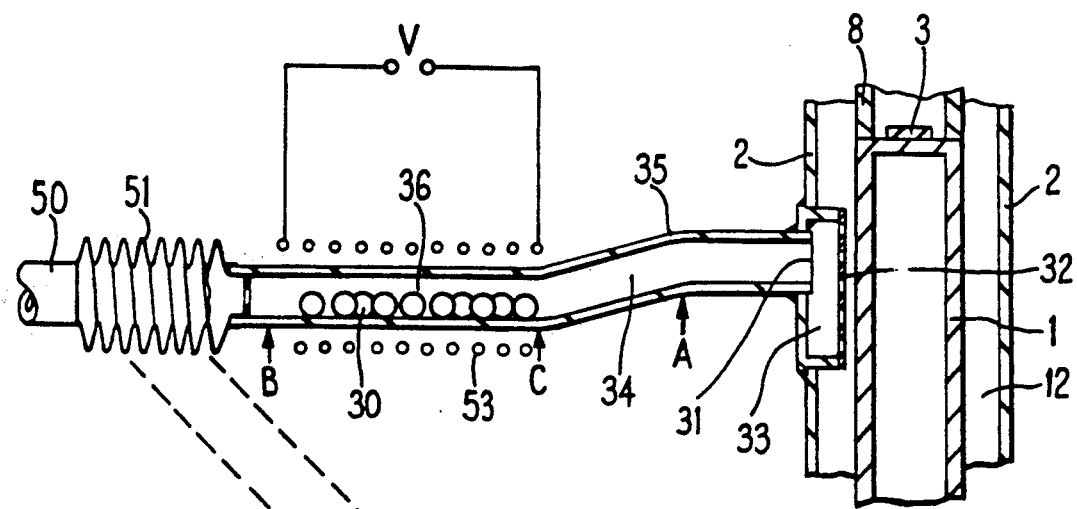
FIGS. 3A and 3B are cross-sectional views of parts of an infrared detector such as that of FIG. 1 at two stages in the production of the vacuum space.
Figure 3B:
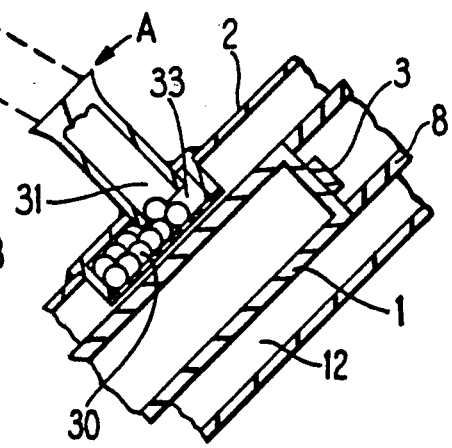

Various known chemically-active getter materials may be used for the body 30 or bodies 30. A particular suitable non-evaporable gettering material is for example the one commercially available from SAES Getters (G.B.) Limited of Croydon, England (SAES Getters/U.S.A. Inc of Colorado Springs U.S.A.) under the SAES trade name St 172. It is a porous sintered structure based on a mixture of Zr and Zr-V-Fe alloy. The St 172 has good mechanical strength and coherence and a high diffusivity of the sorbed gas species. It has a good gettering efficiency even after a low temperature activation, in the range of 400° to 500° C. (degrees Celsius) for between 2 and 10 minutes. This getter material St 172 is available in various forms, for example in a unit with an embedded heating element for Joule heating, or in a metal ring container for inductive heating. It may also be obtained most simply and cheaply in plain pellet form without any support element or any heating aid for activation. The present invention permits use of the getter material in this simple and cheap plain pellet form, but in a manner compatible with a compact dewar envelope 1, 2 and with high performance operation of the infrared detector. The material St 172 is available in bodies formed as sintered spherical pellets 20 (as illustrated in FIGS. 1, 3A and 3B) and as larger sintered cylindrical pellets 30 (as illustrated in FIG. 2). The amount of getter material 30 is chosen in accordance with the volume of residual gases to be gettered in the chamber 12. With a small chamber 12, one large pellet 30 may be sufficient and such a situation is illustrated in FIG. 2. However, FIGS. 1, 3A and 3B illustrate the use of a plurality of pellets 30.

FIGS. 3A and 3B illustrate how the vacuum space is produced in the dewar chamber 12 for the detector of FIG. 1, including a distant heating step to activate the getter 30. Apart from the evacuation-tube outlet 31, constructional features of the detector of FIG. 1 have been shown simplified in FIGS. 3A and 3B, for convenience. At the stage of FIG. 3A, the complete detector dewar 1, 2 (including the sealed end portion 6, 7) is connected via its evacuation tube 35 to a standard vacuum pump for which only part of an inlet tube 50 is shown in FIG. 3A.

The method comprises the steps of evacuating the chamber 12 to create the vacuum space by pumping via the evacuation tube 35, chemically-activating the getter 30 by heating in the evacuation tube 35, and disconnecting the vacuum pump and sealing the evacuation tube 35 after pumping so as to prevent leakage of the vacuum through the evacuation-tube outlet 31 of the chamber 12. In accordance with the present invention, the getter is provided before pumping as at least one loose body 30 movable in the evacuation tube 35. This getter body 30 is heated in the tube 35 at a safe location 36 distant from the chamber 12 so as to activate chemically the getter material 30 after evacuating the chamber 12 by pumping. Preferably at least one bend 34 is present in the longitudinal axis of the tube 35 (as illustrated in FIG. 3A) to define the distant heating location 36 as a difference in level along the tube 35. Afterwards the getter body or bodies 30 are moved into the outlet section 31 close to the chamber 12 by simply tilting the detector dewar 1, 2. In the particular construction of the outlet 31 illustrated in FIGS. 1, 3A and 3B, the vacuum-permeable screen 32 is at least one wall of a miniature chamber 33 which forms the evacuation-tube outlet 31 from the chamber 12 and which serves for accommodating the getter bodies in the vacuum-space. This chamber 33 may be in the form of a cage having at least one perforated wall in the vacuum-space chamber 12.

The St 172 getter bodies 30 as supplied by SAES GETTERS (G.B.) Limited are sealed in cans under a protective atmosphere. During exposure to the normal air ambient at room temperature a thin (protective) layer forms on the surface of the getter material, and this layer must be removed at least partially in order to activate the getter. This activation is carried out by roasting under vacuum in the arrangement illustrated in FIG. 3A. The getter bodies 30 are accommodated in section 36 of the tube 35, and their location is laterally constrained by being at a lower level than the outlet section 31 of the chamber 12. The section 36 is surrounded with an electrical heating coil 53 connected to a switched power supply V. After pumping to evacuate the chamber 12, the St 172 getter bodies are heated to, for example, 450° for 10 minutes by passing a heating current through this coil 53. Because the tube 35 is still connected to the vacuum pump at this stage, by-products of the this activation (such as for example out-gasing of the tube 35 and vaporization products of the thin surface layer on the active getter material) can be pumped away from the vacuum space before sealing the chamber outlet 31. Because the heating location 36 is distant from the chamber 12, there is very little risk of damage to components of the detector (especially the inner wall 1, detector element(s) 3 and electrical connections) either by heat conduction or by heat radiation.

In producing the detector of FIG. 1 with a short evacuation-tube outlet 31, the disconnection and sealing step (c) includes shortening the evacuation tube to a location A which is less distant from the chamber 12 than the location 36 (between B and C) at which the getter bodies are heated in the activation step (e). The detector dewar 1, 2 is first tilted to move the activated bodies 30 into the cage 33 in the chamber 12, as illustrated in FIG. 3B. Further passage of the bodies 30 into the chamber 12 is prevented by the vacuum-permeable screen 32 formed by the wall(s) of the cage 33. Preferably a bendable tube portion 51 is present in the connection between the vacuum pump and the distant location section 36 of the evacuation tube outlet 35 so as to permit tilting of the device with respect to the vacuum pump. The bendable portion 51 may be present as a connector between the vacuum-pump and the dewar evacuation-tube 35, or it may be present as a part of the dewar evacuation-tube 35. By way of one example, FIG. 3A illustrates a bellows tube as the bendable portion. The pump may now be disconnected and the tube outlet 31 may be sealed, for example by a pinch-weld in known manner at location A. Thus, the tube 35 may be of a compression-bondable metal such as copper or stainless steel.

In one typical example for an infrared detector with a small dewar envelope 1, 2, the evacuation tube 35 may have a diameter of, for example, about 2.5 mm with a length from the dewar wall 2 to location B of, for example, about 40 mm. Locations A and C may be at, for example, about 5 mm and 25 mm respectively from the dewar wall 2. The getter bodies 30 may be spherical with a diameter of, for example, between 1.5 and 2 mm, or one or more cylindrical bodies 30 may be used with a diameter of, for example about 1.5 mm and a length of, for example, about 5 mm. The apertures of a perforated foil forming the vacuum-permeable screen 32 may be, for example, about 5 to 10 micrometers in diameter or larger. Such small apertures can be formed in a metal foil by known photolithographic and etching techniques. The foil 32 may be of, for example, copper about 50 micrometers thick. For a fast pump speed, the thickness of the foil 32 (and hence the length of the apertures extending therethrough) is preferably less than the largest transverse dimension of the apertures. This may be achieved by forming the apertures as slots each having, for example, a width of about 25 micrometers or less and a height of about 150 micrometers.

It will be evident that many modifications and variations are possible within the scope of the present invention. Thus, for example instead of including a bellows tube 51 or any other special tube, the bendable portion 51 may be obtained by including a resilient hollow mandrel (for example a helical spring) inside a length of the evacuation tube 35 so as to preserve the tube 35 intact when bending the tube 35 at that location. In another form, instead of a metal bellows tube, the bendable portion 51 may be formed by a straight glass tube, and the evacuation tube 35 may then be sealed off in two stages: first at the glass portion, and then (after tipping the pellets 30 into the cage 33) by pinching off the copper tube at location A as before. Instead of forming the whole tube 35 of a metal such as copper from heating location 36 to the chamber outlet 31, the part of the tube 35 at the heating location 36 may be of a higher temperature material (such as, for example, fused silica or a ceramic) so as to permit activation heating of the getter bodies 30 to a higher temperature. However, in the case of an electrically conductive tube part at location 36, the heating may be carried out by HF induction currents rather than using a heating coil 53.

Instead of sealing the tube 35 at location A, it may be sealed close to the outer wall 2 of the dewar when the getter bodies 33 are accommodated in a cage 33 within the space 12. Thus, in this case the resulting outlet 31 need not even protrude on the outside of the dewar 1, 2. However, if desired, a longer length may be kept by sealing at, for example, location C. This permits the getter bodies 30 to be moved back to a moderately distant location where they can be heated if it is desired to reactivate the getter 30 during the operational lifetime of the detector. If a moderate length of tube 35 is retained at the outlet 31, the cage 33 may be omitted and the getter 30 in the outlet 31 may simply be screened from the chamber 12 by a perforated plate 32 welded over the tube outlet 31 from the chamber 12, as illustrated in FIG. 2.

Although the illustrated specific embodiments relate to infrared detectors with dewars, the present invention may be used with advantage for other evacuated devices (not just dewar devices or even infrared detectors) where it is desired to reduce space or expense in the provision of a chemically-active getter 30 or to avoid the inconvenience of using a getter unit with electrode connections requiring vacuum-tight seals in the vacuum chamber of the device. Thus, for example, some infrared detectors have a simple vacuum envelope (not a dewar) in which the detector elements are mounted on a Peltier (thermo-electric) cooler in the vacuum space. A getter 30 provided and activated in accordance with the present invention can advantageously be accommodated in the sealed evacuation-tube outlet of the vacuum envelope of this non-dewar infrared detector. The invention may be used in producing and maintaining vacuum spaces for other devices, for example, miniature superconductor devices, X-ray tubes, electronic valves, and even miniature vacuum flasks, if so desired. However it is particularly beneficial for infrared detectors.

From reading the present disclosure, other variations will be apparent to persons skilled in the art. Such variations may involve other features which are already known in the design, manufacture and use of getters and of infrared detectors and other vacuum devices, systems, and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of producing a vacuum device having a vacuum space in a chamber of the device, comprising the steps of (a) providing a porous getter in an evacuation tube which forms an outlet of the chamber, (b) evacuating the chamber to produce the vacuum space by means of a vacuum pump connected to the evacuation tube, (c) heating the getter in the evacuation tube so as to activate chemically the getter material and (d) disconnecting the vacuum pump and sealing the evacuation-tube outlet of the chamber while leaving the chemically-active getter in communication with the vacuum space of the chamber to getter gases from the evacuated chamber, characterised in that the step (a) comprises providing the getter as at least one movable body of the getter material in the evacuation tube, in that step (b) comprises heating the getter body in the evacuation tube at a location distant from the chamber, after which the movable getter body is moved closer to the chamber before sealing the evacuation-tube outlet, and in that the evacuation-tube outlet comprises a vacuum-permeable screen which inhibits passage of the getter material into the chamber.

2. A method as claimed in claim 1, further characterised in that the disconnection and sealing step (d) includes shortening the evacuation tube to a location less distant from the chamber than the location at which the getter body is heated in the activation step (b).

3. A method as claimed in claim 1, further characterised in that the getter body is moved closer to the chamber by tilting the device with respect to the vacuum pump, a bendable tube portion being present in the connection between the vacuum pump and the distant location of the evacuation tube so as to permit tilting.

4. A method as claimed in claim 1, further characterised in that a bend is present in the longitudinal axis of the tube to define the distant heating location as a difference in level along the tube.

5. A method as claimed in claim 1, further characterised in that the vacuum-permeable screen is at least one wall of a miniature chamber which forms the evacuation-tube outlet from the vacuum-space chamber, and in that the getter body is moved into the miniature chamber after the step (c) so as to accommodate the getter body in the vacuum space.

6. A method as claimed in claim 1, further characterised in that the device is an infrared detector comprising a dewar with inner and outer walls which provide the device chamber, wherein before the dewar is sealed at least one infrared detector element is mounted on an end of the inner wall remote from the connection of the inner and outer walls of the dewar, after which the step (b) is effected to produce the vacuum space between the inner and outer walls by pumping via the evacuation-tube outlet which is present on the outer wall of the dewar, the movable getter body being present in the evacuation tube during this evacuation step (b).

7. An infrared detector comprising a chamber holding a vacuum space in the detector, the chamber having an evacuation-tube outlet through which the chamber was evacuated, which outlet communicates at one end with the vacuum space of the chamber and is sealed at its opposite end, and a chemically-active porous getter in communication with the vacuum space of the chamber to getter gases from the evacuated chamber, characterised in that the getter comprises at least one movable body of the chemically-active getter material present in the evacuation-tube outlet, and in that the evacuation-tube outlet has a vacuum-permeable screen present between the loose getter body and the chamber to inhibit passage of the getter material into the chamber.

8. A detector as claimed in claim 7, further characterised in that the vacuum-permeable screen is a perforated plate over the outlet of the tube from the chamber.

9. A detector as claimed in claim 7, further characterised in that the vacuum-permeable screen is at least one wall of a miniature chamber which forms the evacuation-tube outlet from the vacuum-space chamber and which serves for accommodating the getter body in the vacuum space.

10. A detector as claimed in claim 7, further characterised in that the screen has apertures extending through its thickness, and the thickness of the screen is less than the largest transverse dimension of the aperture.

* * * * *